United States Patent
Zhai et al.

(10) Patent No.: US 9,760,574 B1
(45) Date of Patent: Sep. 12, 2017

(54) MANAGING I/O REQUESTS IN FILE SYSTEMS

(71) Applicant: EMC Corporation, Hopkinton, MA (US)

(72) Inventors: Jia Zhai, Beijing (CN); Yingchao Zhou, Beijing (CN); Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 492 days.

(21) Appl. No.: 14/318,856

(22) Filed: Jun. 30, 2014

(51) Int. Cl.
*G06F 7/00* (2006.01)
*G06F 17/30* (2006.01)

(52) U.S. Cl.
CPC .. *G06F 17/30091* (2013.01); *G06F 17/30943* (2013.01)

(58) Field of Classification Search
None
See application file for complete search history.

(56) References Cited

U.S. PATENT DOCUMENTS

| | | | | |
|---|---|---|---|---|
| 6,553,476 B1* | 4/2003 | Ayaki | G06F 3/0601 | 386/E5.042 |
| 7,487,228 B1* | 2/2009 | Preslan | G06F 17/30067 | 709/218 |
| 7,822,728 B1* | 10/2010 | Chandler | G06F 17/30171 | 707/700 |
| 8,600,935 B1* | 12/2013 | Dantkale | G06F 17/30073 | 707/624 |
| 8,862,645 B1* | 10/2014 | Ma | G06F 17/30091 | 707/827 |
| 9,213,717 B1* | 12/2015 | Pawar | G06F 17/30171 | |
| 2005/0044311 A1* | 2/2005 | Lahiri | G06F 12/0804 | 711/113 |
| 2005/0066095 A1* | 3/2005 | Mullick | G06F 17/30171 | 710/200 |
| 2005/0091244 A1* | 4/2005 | Marcotte | G06F 9/544 | |
| 2006/0020752 A1* | 1/2006 | Schnapp | G06F 12/0804 | 711/113 |
| 2006/0224784 A1* | 10/2006 | Nishimoto | G06F 3/0611 | 710/36 |
| 2007/0130387 A1* | 6/2007 | Moore | G06F 13/20 | 710/40 |
| 2013/0007368 A1* | 1/2013 | Sterns | G06F 12/0868 | 711/124 |

* cited by examiner

*Primary Examiner* — Hasanul Mobin
(74) *Attorney, Agent, or Firm* — Krishnendu Gupta; Jason Reyes; Deepika Bhayana (57) ABSTRACT

A method is used in managing I/O requests in file systems. A first and second I/O requests are received. The first I/O request is directed to a first portion of a file and the second I/O request is directed to a second portion of the file. Respective first portions of the first and second I/O requests are performed concurrently. Respective second portions of the first and second I/O requests are performed concurrently. Execution of the second I/O request starts before execution of the first I/O request finishes.

10 Claims, 7 Drawing Sheets

MANAGING I/O REQUESTS IN FILE SYSTEMS

BACKGROUND

Technical Field

This application relates to managing I/O requests in file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. In a data storage system, hundreds of files may be created, modified, and deleted on a regular basis. Each time a file is modified, the data storage system performs a series of file system updates. These updates, when written to a disk storage reliably, yield a consistent file system.

Generally, data and metadata of a file of a file system read from a disk and written to a disk may be cached in a volatile memory such as a system cache of a data storage system. Caching of data and metadata of a file implies that read operations read data and metadata of the file from the volatile memory, rather than from a disk. Correspondingly, write operations may write data and metadata of a file to the volatile memory rather than to a disk. Data and metadata of a file cached in the volatile memory is written to the disk at intervals determined by an operating system of the data storage system, which is referred to as flushing of a cache. Flushing of a cache is triggered at a determinate time interval. Caching data and metadata of a file of a file system in a volatile memory improves performance of the file system as accessing data from a disk involves an I/O operation to a disk which is slower than accessing data from the volatile memory.

A write I/O request using a "file sync" option requires that a write operation directed to a file writes both data and metadata immediately to a disk rather than incurring a delay. However data and metadata may still be written into a cache. On the other hand, a write I/O request using a "data sync" option requires that data is written immediately to a disk but metadata may be cached and flushed to the disk at a later time.

SUMMARY OF THE INVENTION

A method is used in managing I/O requests in file systems. A first and second I/O requests are received. The first I/O request is directed to a first portion of a file and the second I/O request is directed to a second portion of the file. Respective first portions of the first and second I/O requests are performed concurrently. Respective second portions of the first and second I/O requests are performed concurrently. Execution of the second I/O request starts before execution of the first I/O request finishes.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing I/O requests in file systems, which technique may be used to provide, among other things, receiving a first and second I/O requests, where the first I/O request is directed to a first portion of a file and the second I/O request is directed to a second portion of the file, performing respective first portions of the first and second I/O requests concurrently, and, performing respective second portions of the first and second I/O requests concurrently, where execution of the second I/O request starts before execution of the first I/O request finishes.

Generally, one of the mechanisms used to ensure that metadata and/or data of a file of a file system is correctly written and ordered on a persistent storage (e.g., disks) is by using a cache. Thus, changes to metadata and/or data resulting from a write operation directed to a file are stored in a cache and eventually transferred to a persistent storage, preferably before a subsequent read operation.

Typically, data and metadata of a file of a file system read from a disk and written to a disk may be cached in a memory such as a system cache of a data storage system. Caching of data and metadata of a file implies that read operations read data and metadata of the file from the memory, rather than from a disk. Correspondingly, write operations may write data and metadata of a file to the memory rather than to a disk. Generally, caching data and metadata of a file of a file system in a memory improves performance of the file system as accessing data from a disk involves an I/O operation to a disk which is slower than accessing data from the memory. Data and metadata of a file cached in the memory is written to the disk at intervals determined by an operating system of the data storage system, which is referred to as flushing of a cache. Further, metadata and/or data of a file system may be flushed to a persistent storage based on either a specific pre-determined threshold value or in response to a specific condition such as low available memory.

Conventionally, a file system component use a list of buffers for caching write I/O requests for a file system such that a write I/O request cached in a buffer is flushed to a storage device at a later time by sending the write I/O request to a lower layer component (e.g. core file system logic) for performing the write I/O request. Generally, each write I/O request is comprised of a set of operations such as a first operation also referred to as a map-for-write operation that maps a logical address within a file system associated with the write I/O request to corresponding physical address on a storage device, a second operation also referred to as a write I/O operation that performs the write operation on the storage device at the physical address mapped by the map-for-write request, and a third operation also referred to as a commit-map-for-write operation that commits metadata to the storage device and releasing resources acquired during the write I/O operation. In such a conventional system, random write I/O requests (e.g., non-adjacent write I/O requests) for a file system are not gathered and processed together but processed separately by sending each random write I/O request to a core file system logic one at a time in a sequential order for processing. Further, in such a conventional system, not only each write I/O request is performed synchronously but each operation of a write I/O request is performed synchronously in a sequential order. Thus, in such a conventional system, if, for example, three random and non-adjacent write I/O requests for a file system are received from a client, each write I/O requests is processed separately such that three map-for-write operations, three write I/O operations, and three commit-map-for-write operations are processed one by one synchronously in a sequential manner. As a result in such a conventional system, performance of a storage system and a file system degrades significantly as a large number of write I/O requests are performed synchronously one at a time in a sequential manner. Further, in such a conventional system, processing a large number of write I/O requests synchronously in a sequential manner increases a response time for a storage system and a file system. Further, in such a conventional system, processing write I/O requests synchronously in a sequential manner results in increased number of times various file system locks are acquired and released for performing the write I/O requests and increased number of times inodes of the file system are updated thereby increasing CPU contention and use of system resources in a storage system.

By contrast, in at least some implementations in accordance with the current technique as described herein, random write I/O requests received for a file system are gathered in a list and processed concurrently thereby improving random write I/O performance of the file system. Further, in at least some implementations in accordance with the current technique as described herein, the current technique gathers a number of write I/O requests together and send it to a lower layer component such that the number of write I/O requests may be processed together and concurrently. Thus, in at least some implementations in accordance with the current technique, data and metadata changes associated with a set of write I/O requests may be applied together to a file system organized on a storage device by updating inodes of the file system. Further, in at least some implementations in accordance with the current technique, executing write I/O operations concurrently enables a storage system to use storage disks that are organized based on a specific RAID ("redundant array of inexpensive disks") scheme effectively as the write I/O operations may be grouped together in an efficient manner. Further, in at least some implementations in accordance with the current technique, combining a number of map-for-write operations associated with a number of write I/O requests decreases the amount of time required to perform mapping operations as the number of times file system locks are acquired and released is decreased by performing the map-for-write operations concurrently. Similarly, in at least some implementations in accordance with the current technique, combining a number of commit-map-for-write operations associated with a number of write I/O requests decreases the amount of time required to commit mapping changes to a storage device as the number of times inodes of a file system are updated is decreased by performing updates to the inodes concurrently.

In at least some implementations in accordance with the technique as described herein, the use of the managing I/O requests of file systems technique can provide one or more of the following advantages: reducing I/O load on a data storage system by reducing a number of times data and metadata changes are applied on a persistent storage, increasing a write I/O performance by reducing a write latency for file systems by combining a set of write I/O requests together for concurrent processing, reducing CPU contention by reducing the number of times file system locks are acquired and released for performing write I/O operations, and improving write throughput performance and decreasing write latency for a file system by performing a portion of operations associated with random and non-adjacent write I/O requests for a file system concurrently.

Figure 1:
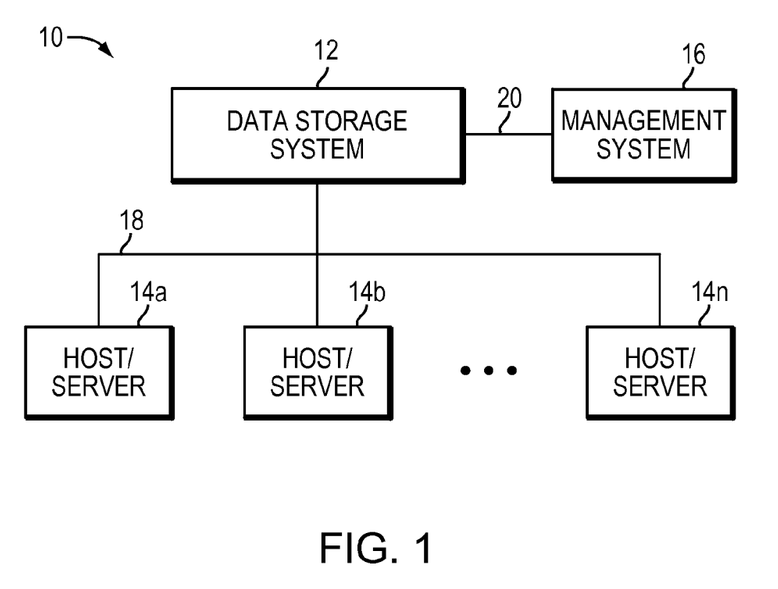
FIGS. 1 and 2 are examples of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
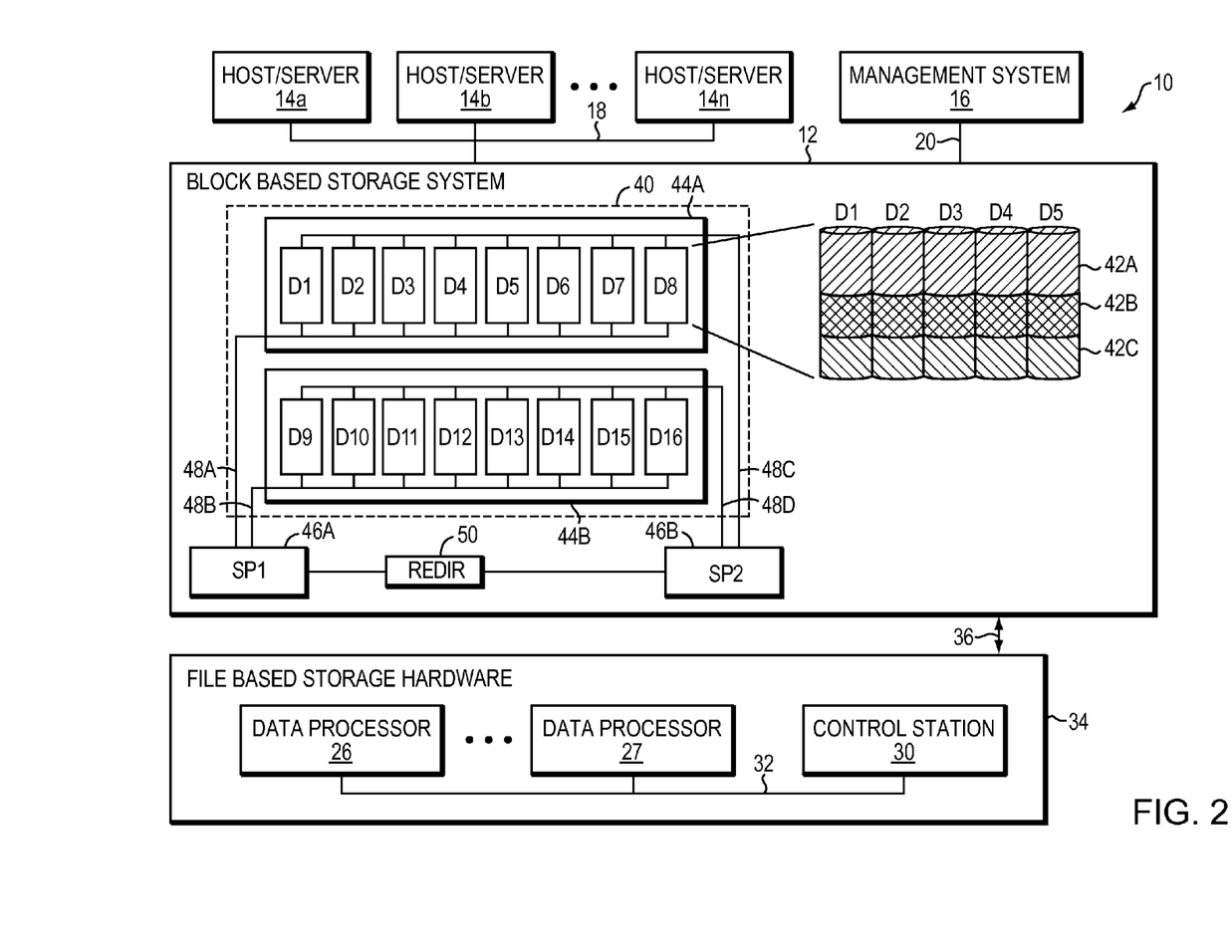

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12. The computer system 10 includes one or more block based data storage systems 12 connected to host systems 14a-14n through communication medium 18.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

In at least one embodiment of the current technique, the data processor 26 may be programmed with a Network File System (NFS) module for supporting communication with network clients over the data network 20 using the NFS file access protocol, and a Common Internet File System (CIFS) module for supporting communication with network clients over the data network using the CIFS file access protocol. The NFS module, and the CIFS module are layered over a Common File System (CFS) module, and the CFS module is layered over a Virtual File System (VFS) module. The VFS module is layered over a Universal File System (UxFS) module. The UxFS module is a file system manager for managing a file system such as a UNIX-based file system. The CFS module provides higher-level functions common to NFS and CIFS.

The file system manager accesses data organized into logical volumes defined by a logical volume layer module. Each logical volume maps to contiguous logical storage addresses in the cached disk array. The logical volume layer module is layered over a storage driver such as a Fibre-Channel (FC), a Small Computer System Interface (SCSI), and an Internet SCSI (iSCSI) driver. The data processor 26 sends storage access requests through a host bus adapter 36 using a storage protocol such as the FC, SCSI, or iSCSI used by the storage driver, depending on the physical data link 36 between the data processor 26 and the cached disk array 40.

Further, the CFS module, the VFS module, the file system manager, the logical volume layer, and the storage driver may be modules of an operating system program executing on file based storage hardware 34.

Generally, a file system stored on a storage device is organized as a hierarchy. At the top of the hierarchy is a hierarchy of directories in the file system. Inodes of data files depend from the file system directory hierarchy. Indirect blocks of data files depend from the inodes of the data files. Data block metadata and data blocks of data files depend from the inodes of data files and from the indirect blocks of data files. Specific examples of this hierarchy are further described below with reference to FIG. 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 12 also includes journal such as a file system transaction log. Changes in metadata of a file system is first written to file system transaction log. Metadata information stored in the file system transaction log is later used to recover the file system when file server reboots due to a failure. Upon reboot of file server, file system transaction log is inspected to find a last valid transaction recorded in the log, and the last valid transaction is applied to the file system stored on a persistent storage for updating metadata of the file system by using metadata information stored in file system transaction log.

Figure 3:
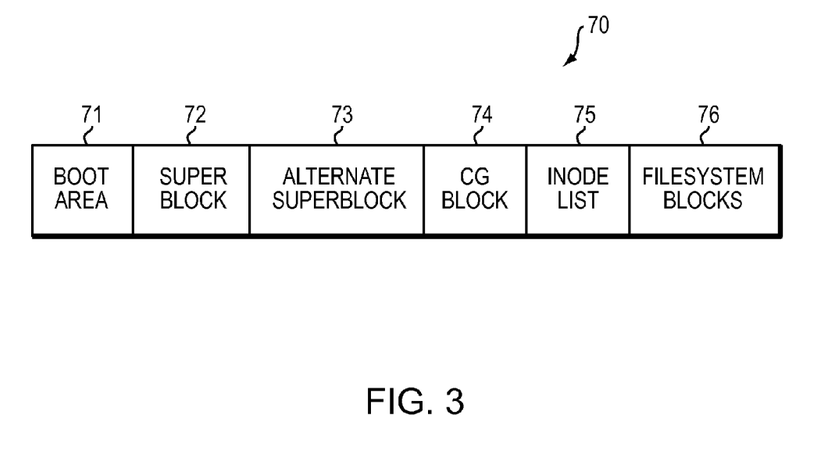
FIGS. 3-5 are a diagram illustrating in more detail components that may be used in connection with techniques herein.

Referring to FIG. 3, shown is a representation of an on-disk layout of a file system that may be included in an embodiment using the current techniques described herein. A file system 70 includes a boot area 71, a superblock 72, an alternate superblock 73, Cylinder Group Block (CG) block 74, an inode list 75, and file system blocks 76. The boot area 71 may contain code for booting an operating system of file server 23. The superblock 72 and alternate super block 73 contains attributes and metadata of the file system. Cylinder Group Block 74 contains metadata information pertaining to cylinder groups of the file system. Inode list 75 includes the list of all inodes of each file that is present in the file system.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). However, it should be noted that a file system may be organized based on any one of the known mapping techniques such as an extent based binary tree mapping mechanism.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Figure 4:
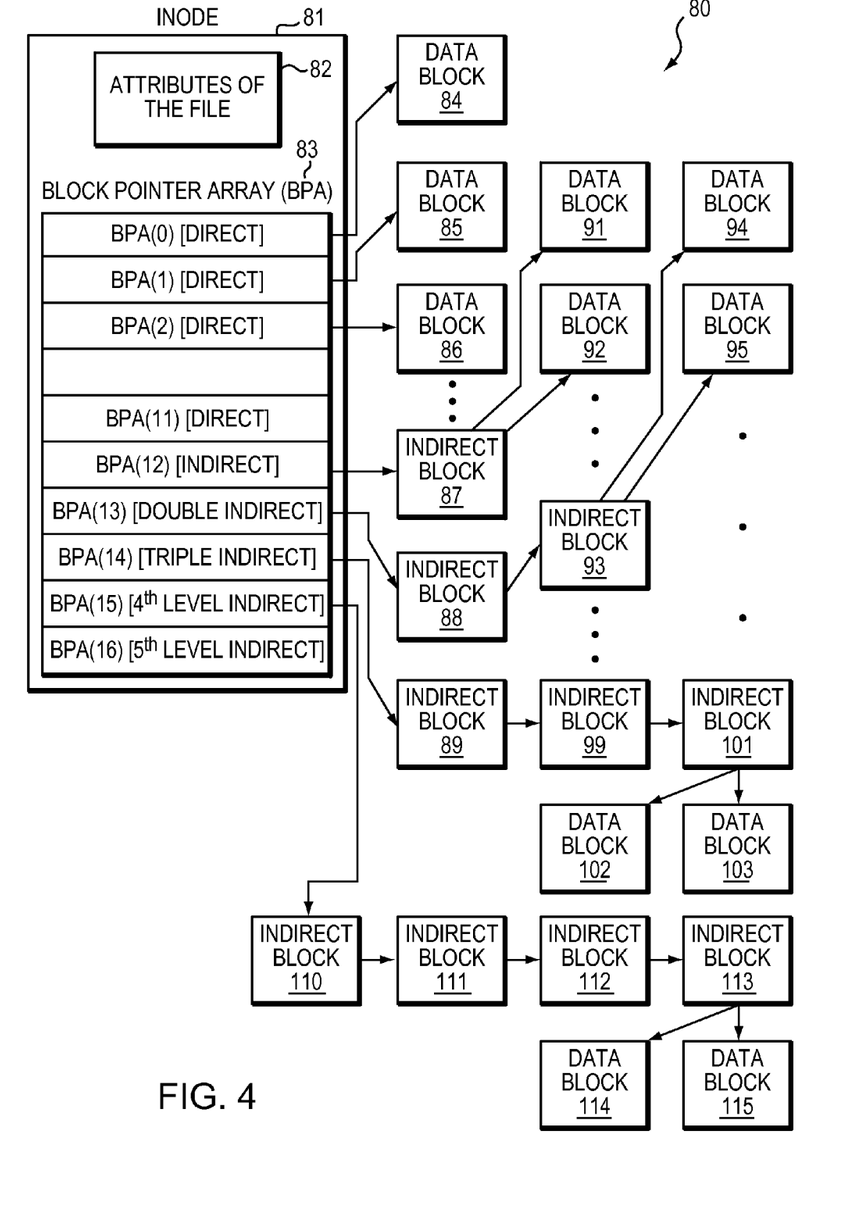

Referring to FIG. 4, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks (e.g., 102, 103). Similarly the file may include fourth (BPA(15)) and fifth (BPA(16)) level of indirections indicated by indirect blocks 110-113 and data blocks 114-115.

Figure 5:
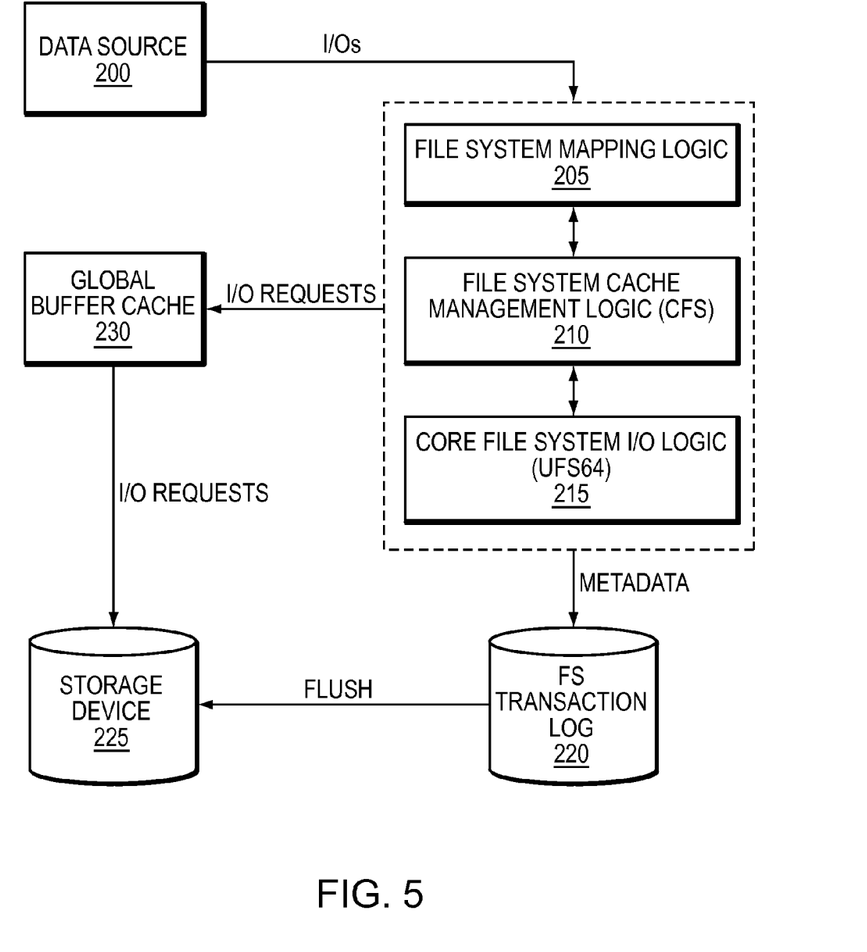

Referring to FIG. 5, shown is a more detailed representation of components that may be included in an embodiment using the techniques described herein. In at least one embodiment of the current technique, data source 200 (e.g., a host, a client) access a file system using any one of data access protocols (such as CIFS, NFS, and iSCSI) by issuing an I/O request (e.g., read, write) to the file system. With reference also to FIGS. 1-4, core file system I/O logic 215 (also referred to herein as "UFS64") provides functionality for creating and hosting a file system in a data storage system. File system cache management logic 210 (also referred to herein as "Common File System" or "CFS") provides a functionality and a set of interfaces for accessing and managing files of a file system. CFS 210 includes mapping information that maps an offset of a file to a buffer cache block that is cached in the global buffer cache 230. File system mapping logic 205 provides interfaces for mapping a mapped logical volume to a file system organized on storage device 225 and maintained by CFS 210 and UFS64215. Global buffer cache 230 may either be organized on a volatile memory of a storage system or on a persistent storage of the storage system. Global buffer cache 230 may include a buffer cache pool, where the buffer cache pool includes a collection of buffer cache blocks such that each buffer cache block may correspond to file system block of a file system. The buffer cache pool provides buffer cache blocks to applications for storing data and/or metadata of a file system. The buffer cache pool manages allocation, caching and deallocation of buffer cache blocks.

Clients of a storage system may execute applications which access file systems stored on storage devices via a storage system such as a file server. A storage device on which a file system is stored may be apportioned into fixed size file system blocks, for organizational purposes.

A file system contains a range of file system blocks that store metadata and data. File system blocks are allocated from a storage device for creating files and storing metadata of a file system. In at least some embodiments of the current technique, the file system block may be 8 kilobyte (KB) in size. Thus, in at least one embodiment of the current technique, there may exist 1-1 correspondence between a file system block and a buffer cache block. However, it should be noted that there may not be a 1-1 correspondence between a file system block and a buffer cache block. Further, a file system block may be of a different size as well.

Further, a data or metadata block of a file of a file system that is cached in the global buffer cache 230, may also be stored in a persistent journal such as file system transaction log 220 associated with the file system in a case where the data and/or metadata block is a dirty block indicating that the dirty block has not been flushed to a storage device yet. Further, global buffer cache 230 provides CFS 210 and file system I/O logic 215 consistent access to a set of data blocks and metadata blocks cached in the buffer cache pool.

In at least one embodiment of the current technique, file system transaction log 220 provides a functionality for logging a set of data and/or metadata blocks associated with write I/O requests to a file system such that the set of data and/or metadata blocks may be cached in a global buffer cache 230.

Generally, if a file system data block stored on a persistent storage includes a different version of data compared to data stored in an in-memory buffer (e.g., a buffer cache block of a buffer cache pool) associated with the file system data block, the in-memory buffer is indicated as a dirty buffer (also referred to herein as "dirty metadata buffer", and "dirty data buffer"). Thus, in such a case, contents of the dirty in-memory buffer are flushed to the persistent storage at a later time in order to ensure that a single location on the persistent storage stores the up-to-date data and/or metadata for the file system data block. Typically, a dirty buffer results from an unstable (also referred to as "asynchronous") write operation. Further, a background process is used to flush dirty in-memory buffers created by asynchronous write I/O operations thereby reducing latency of the asynchronous write I/O operations.

The process of flushing data commits the data from dirty in-memory buffers that are cached in buffer cache 230 to a file system stored on a persistent storage. A new overlapping write I/O request to any one of the dirty buffers may generate a copy of the dirty buffer to which the overlapping write I/O request is targeted to. Then, the new overlapping write I/O request updates the copy of the dirty buffer in order to ensure that only the data that has been acknowledged to a client is written to the persistent storage.

After providing the acknowledgment to a client for a write I/O operation, a background flush process writes the data associated with the write I/O operation cached in the buffer cache 230 to the storage device 225. The background flush process may be executed at a specified time based on a criteria such as a threshold value. The background flush process writes data stored in the buffer cache 230 to the storage device 225 and writes metadata associated with the data from file system transaction log 220 to the storage device 225.

Figure 6:
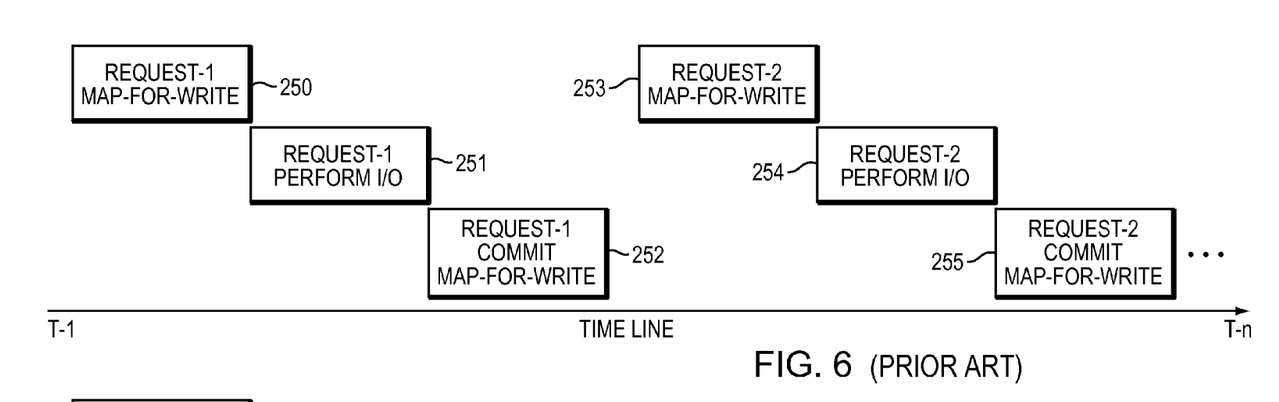
FIG. 6 is a diagram illustrating sequence of operations that may be performed in connection with a conventional technique herein.

Referring to FIG. 6, shown is a representation of a conventional technique for processing a conventional write I/O request for a file system in a conventional system. Conventionally, each random and non-adjacent write I/O request associated with flushing data to a storage device is processed separately and performed in a sequential manner such that processing for a next write I/O request does not start until a previous write I/O request finish executing. Thus, for example, as illustrated in FIG. 6, conventionally, the first operation 250 (e.g., map-for-write) associated with a first write I/O request directed to a logical address of a file system for mapping the logical address of the file system to a physical address is executed. After the first operation 250 is finished, the second operation 251 (e.g., I/O operation) associated with the first write I/O request is executed which writes data associated with the write I/O request to a storage device. When execution of the second operation 251 is finished, the third operation 252 (e.g., commit-map-for-write) associated with the first write I/O request is performed which updates metadata to indicate that the first write I/O request has been finished successfully and metadata has been committed to the storage device. In such a conventional system, when all three operations 250-252 associated with the first write I/O request finish execution, processing of the second write I/O request is started. In such a conventional system, during processing of the second write I/O request, similar to the processing performed for the first write I/O request as described above herein, each operation 253, 254, 255 associated with the second write I/O request is performed in a sequential manner.

Figure 7:
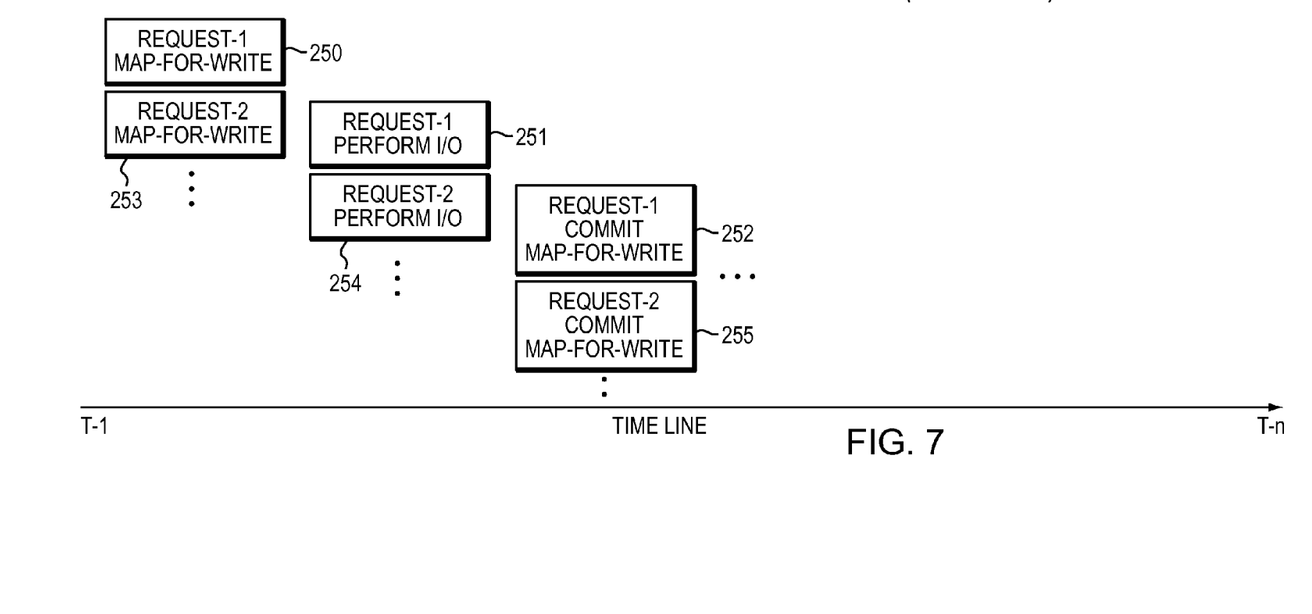
FIG. 7 is a diagram illustrating sequence of operations that may be performed in connection with a current technique described herein.

Referring to FIG. 7, shown is a more detailed representation of components that may be included in an embodiment using the techniques described herein. In at least one embodiment of the current technique, a number of write I/O requests are gathered together and portions of each write I/O requests are executed concurrently such that a next write I/O requests may be started before a previous write I/O requests finish performing.

In at least one embodiment of the current technique, when a write IO request is received for a file system, data and metadata (e.g., file address) associated with the write I/O request are cached in buffer cache 230. Further, the data and metadata associated with the write I/O request are stored in an I/O list associated with a file fork data structure for a file of the file system. During flushing of data and metadata from the buffer cache 230, metadata such as file address stored in the I/O list is mapped to a physical address of the file and data is then written to the storage device 225 by core file system I/O logic 215. A function such as "BlockChainWrite" may be used to flush data from the I/O list which is a list of entries such as a "BlockChain" entry and the I/O list may be stored in the file fork data structure for the file. Thus, in at least one embodiment of the current technique, a file fork structure associated with a file of a file system refers to an I/O list which is a list of "BlockChain" entries, each entry of the list of entries referring to a buffer cache block cached in global buffer cache 230 and file system offset (also referred to herein as "file system block number"). Such I/O list may be sorted based on the value of a file system offset. The "BlockChainWrite" function may send an I/O request associated with an entry of the I/O list for a file of a file system to UFS64 215 which further invokes a function (e.g., "BlockChainWriteInternal") in UFS64 215 for performing the I/O request. The function in UFS64 215 for processing an I/O request for a file is comprised of at least three operations. The first operation includes a map-for-write operation which generates mapping information for the file offset at which the I/O request is to be performed, acquires file system locks for performing the I/O operation, generate extents, makes a determination that an indirect block chain from the inode of the file to the leaf entry of the indirect block chain is available for performing the I/O operation, and pre-allocates file system blocks. The second operation for processing an I/O request includes an I/O operation that performs the I/O operation and writes data to the file organized on storage device 225. The third operation for processing an I/O request includes a commit-map-for-write operation which commits metadata associated with the I/O request to storage device 225 and releases file system locks acquired for performing the I/O operation. In at least one embodiment of the current technique, a capability is provided to perform map-for-write and commit-map-for-write operations for each random write I/O request concurrently.

For example, as illustrated in FIG. 7, in at least one embodiment of the current technique, in contrast to the conventional technique as illustrated in FIG. 6, execution of the first operation 250 (e.g, map-for-write) associated with a first write I/O request directed to a logical address of a file system is performed which maps the logical address of the file system to a physical address for the file system. Concurrent to execution of the first operation 250, execution of the first operation 253 (e.g, map-for-write) associated with a second write I/O request is started. At some point in time, execution of the second operation 251 (e.g., I/O operation) associated with the first write I/O request is started as soon as the map-for-write 250 for the first write I/O request finishes even though the first operation 253 associated with the second write I/O request that has been started concurrently with the first request may not have finished. Concurrent to the execution of the second operation 251 associated with the first write I/O request, execution of the second operation 254 (e.g., I/O operation) associated with the second write I/O request is started. Further, in at least one embodiment of the current technique, at some point in time, execution of third operations 252, 255 (e.g., commit-map-for-write) associated with the first and second write I/O requests is started concurrently. Thus, in at least one embodiment of the current technique, a number of operations associated with a set of random write I/O requests are executed concurrently.

Figure 8:
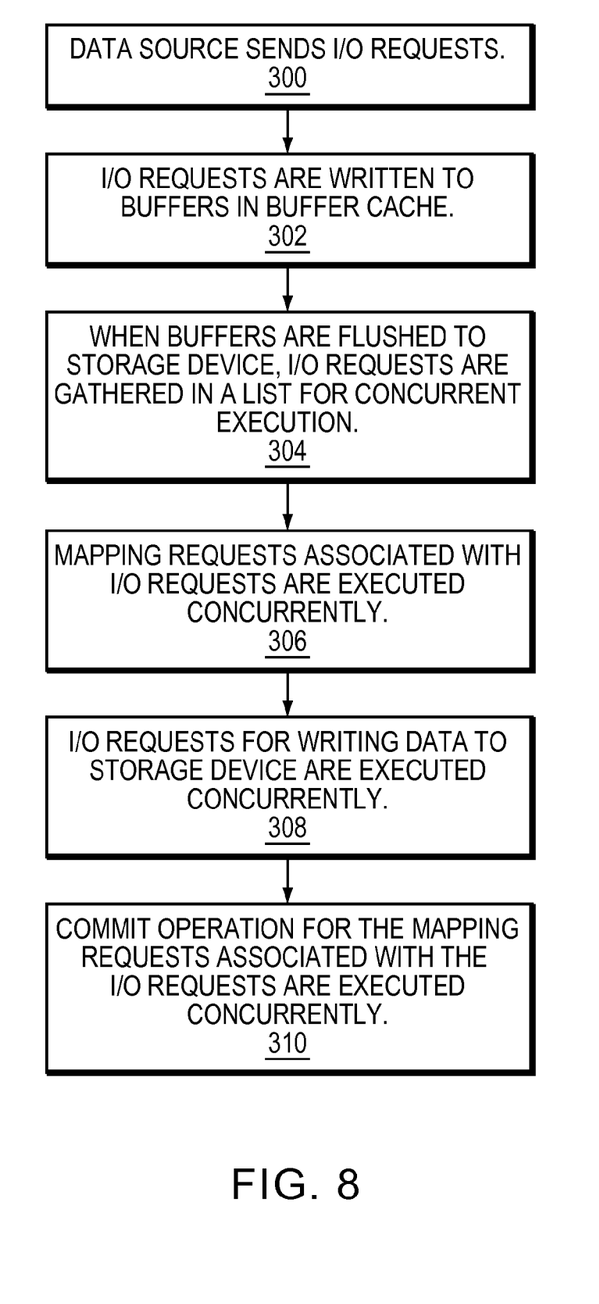
FIG. 8 is a flow diagram illustrating processes that may be used in connection with techniques herein.

Referring to FIG. 8, shown is a flow diagram illustrating a flow of data in a data storage system. With reference also to FIGS. 1-5 and 7, in at least one embodiment of the current technique, a data source (e.g., a client, a host system) sends a write I/O request to a file system (step 300). The data and metadata for the write I/O request are written to a set of buffers cached in a buffer cache (step 302). A set of buffers are flushed to a storage device at a later time for committing changes stored in the set of buffers to the file system stored on a storage device. A set of write I/O requests stored in the buffer cache are gathered together for concurrent execution (step 304). Mapping requests (e.g., map-for-write) for mapping logical addresses of the file system to physical addresses on the storage device associated with each of the write I/O requests are executed concurrently, in parallel to each other (step 306). I/O operations for writing data to the file system organized on the storage device associated with each of the write I/O requests are executed concurrently, in parallel to each other (step 308). Some I/O operations referred to in step 308 may be started before all I/O operation in step 308 finish execution. Generally, an I/O operation for a write I/O request may be executed when a map-for-write operation for the write I/O request finishes. Commit operations (e.g., commit-map-for-write) associated with each of the write I/O requests are executed concurrently, in parallel to each other (step 310). Generally, a commit-map-for-write operation for a write I/O request may be executed when an I/O operation for the write I/O request finish execution.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing I/O requests in file systems, the method comprising:
    receiving a set of write I/O requests directed to nonadjacent portions of a file, wherein the set of write I/O requests flushes data of the file cached in a set of buffers to the file organized on a storage device, wherein a write I/O request includes a map-for-write operation, an I/O operation, and a commit map-for-write operation, wherein the map-for-write operation provides mapping of a file offset at which the write I/O request is directed, wherein the I/O operation performs the I/O operation by writing data associated with the write I/O request to the file organized on the storage device, wherein the commit map-for-write operation commits metadata associated with the write I/O request to the storage device;
    performing respective map-for-write operations of each write I/O request of the set of I/O requests concurrently;
    performing respective I/O operations of each write I/O request of the set of I/O requests concurrently, wherein execution of a next write I/O request starts prior to execution of a previous write I/O request finishes; and
    performing respective map-for-write operations of each write I/O request of the set of I/O requests concurrently upon completion of execution of respective I/O operations of each write I/O request.

2. The method of claim 1, wherein the set of write I/O requests includes random write I/O requests directed to nonadjacent portions of the file.

3. The method of claim 1, wherein the set of write I/O requests are executed by a flush process that sync data from a cache to the storage device.

4. The method of claim 1, wherein map-for-write operations for each write I/O request received for the file are grouped together for concurrent execution, wherein I/O operations for each write I/O request received for the file are grouped together for concurrent execution, wherein commit map-for-write operations for each write I/O request received for the file are grouped together for concurrent execution.

5. The method of claim 1, wherein a file system I/O logic performs each write I/O request received for the file.

6. A system for use in managing I/O requests in file systems, the system comprising a processor configured to:
    receive a set of write I/O requests directed to nonadjacent portions of a file, wherein the set of write I/O requests flushes data of the file cached in a set of buffers to the file organized on a storage device, wherein a write I/O request includes a map-for-write operation, an I/O operation, and a commit map-for-write operation, wherein the map-for-write operation provides mapping of a file offset at which the write I/O request is directed, wherein the I/O operation performs the I/O operation by writing data associated with the write I/O request to the file organized on the storage device, wherein the commit map-for-write operation commits metadata associated with the write I/O request to the storage device;
    perform respective map-for-write operations of each write I/O request of the set of I/O requests concurrently;
    perform respective I/O operations of each write I/O request of the set of I/O requests concurrently, wherein execution of a next write I/O request starts prior to execution of a previous write I/O request finishes; and
    perform respective map-for-write operations of each write I/O request of the set of I/O requests concurrently upon completion of execution of respective I/O operations of each write I/O request.

7. The system of claim 6, wherein the set of write I/O requests includes random write I/O requests directed to nonadjacent portions of the file.

8. The system of claim 6, wherein the set of write I/O requests are executed by a flush process that sync data from a cache to the storage device.

9. The system of claim 6, wherein map-for-write operations for each write I/O request received for the file are grouped together for concurrent execution, wherein I/O operations for each write I/O request received for the file are grouped together for concurrent execution, wherein commit map-for-write operations for each write I/O request received for the file are grouped together for concurrent execution.

10. The system of claim 6, wherein a file system I/O logic performs each write I/O request received for the file.

* * * * *